Oct. 21, 1958  R. H. SMITH  2,857,505
STUD WELDING APPARATUS
Filed April 19, 1955  3 Sheets-Sheet 2
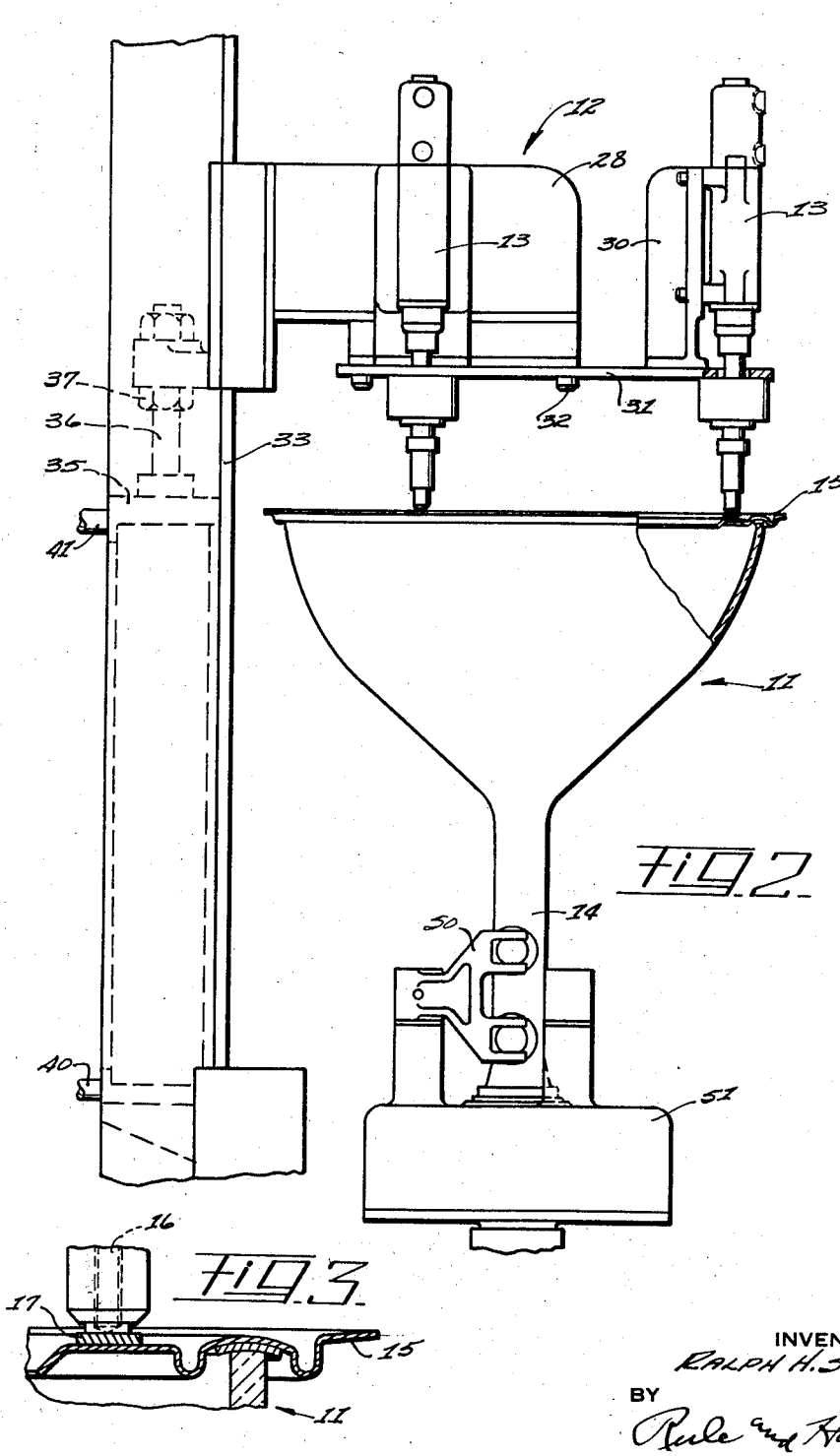
INVENTOR
RALPH H. SMITH
BY
Rule and Hoge Oct. 21, 1958 R. H. SMITH 2,857,505
STUD WELDING APPARATUS
Filed April 19, 1955 3 Sheets-Sheet 3
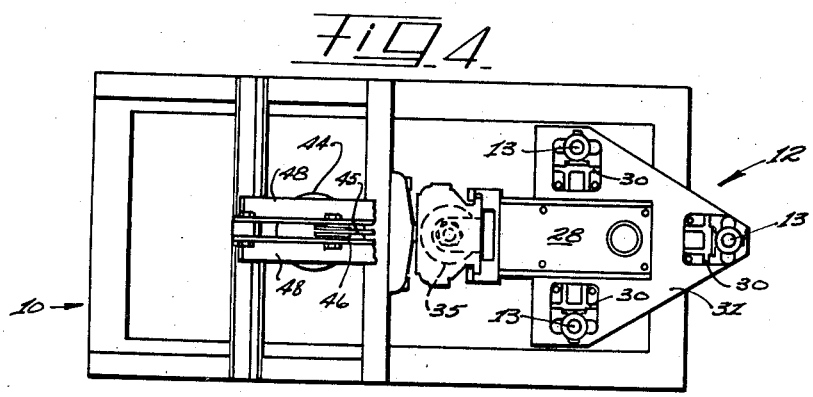
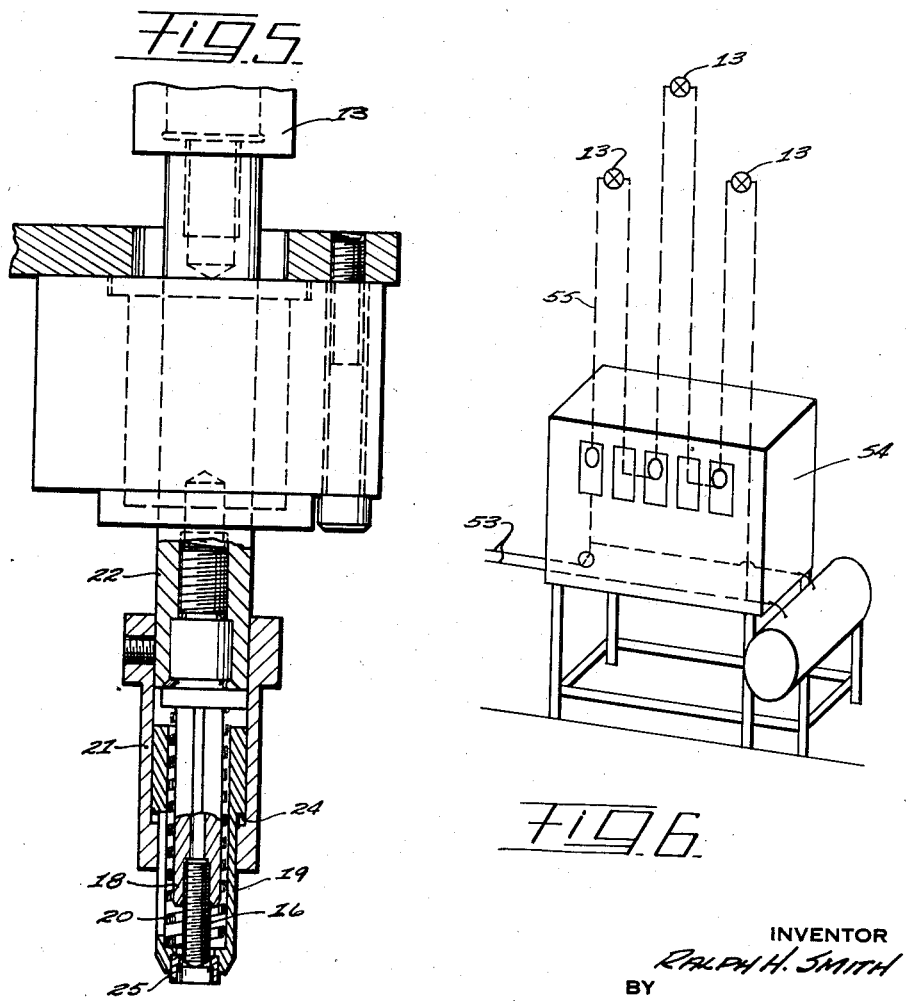
INVENTOR
RALPH H. SMITH
BY
Rule and Hoge United States Patent Office 2,857,505
Patented Oct. 21, 1958

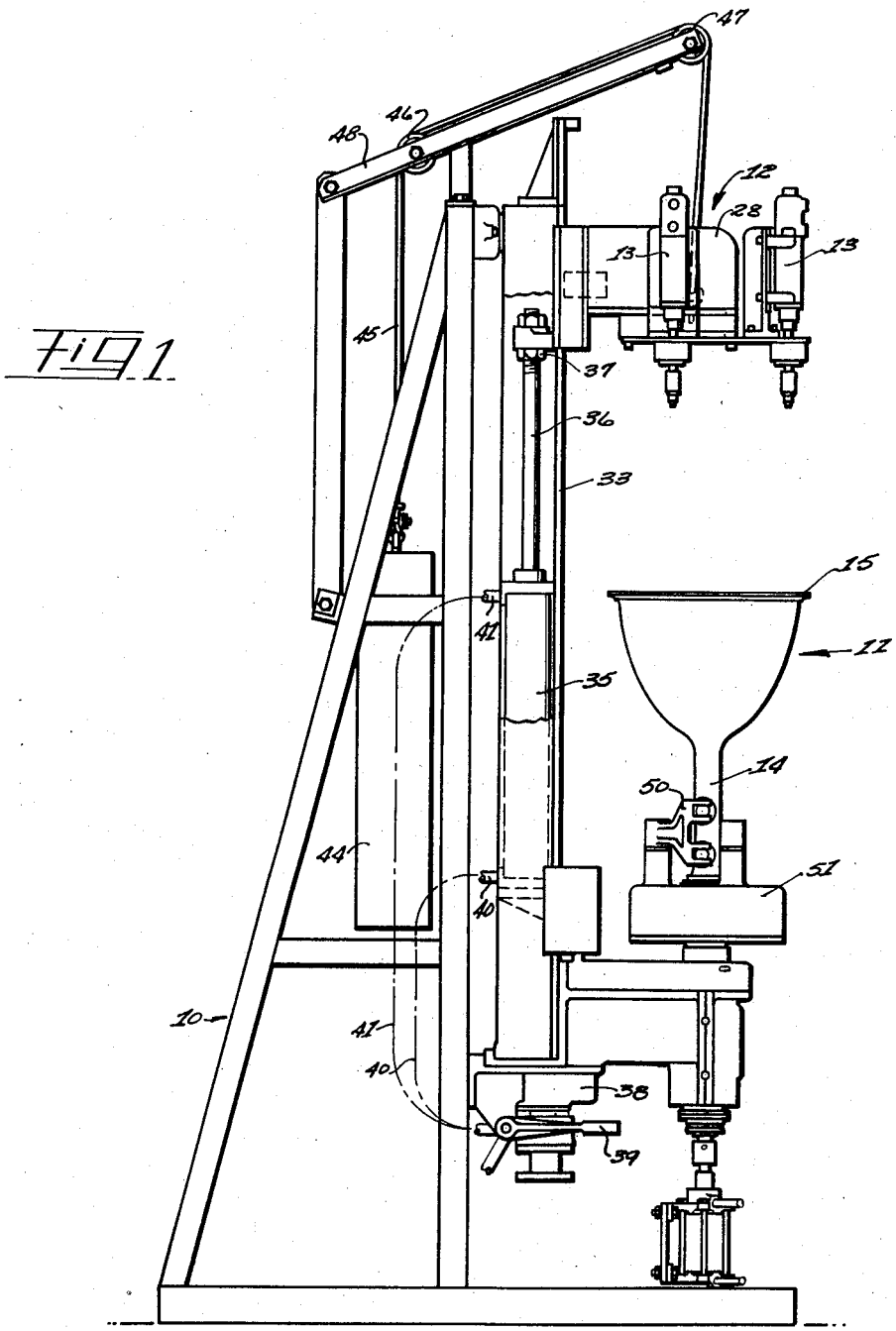

2,857,505

STUD WELDING APPARATUS

Ralph H. Smith, Toledo, Ohio, assignor to Owens-Illinois Glass Company, a corporation of Ohio Application April 19, 1955, Serial No. 502,410

9 Claims. (Cl. 219—98)

My invention relates to welding apparatus. As herein illustrated and described the invention is particularly adapted for use in welding studs to a metal ring such as used in mounting screen grids in cathode ray tubes. In such tubes and particularly those used in color television it is the practice to weld metal studs to a ring which provides a connection between the funnel or body of the tube and the screen grid. In this operation it is necessary that these studs be very accurately located with respect to the screen grid and picture tube, no variations in the relative positions of the parts being permissible.

An object of the present invention is to provide means by which such accuracy in the location of the welded studs may be obtained. A further object of the invention is to provide a practical construction by which a plurality of such studs may be welded simultaneously and accurately located with respect to each other and the tube.

The invention provides an apparatus comprising means for mounting and supporting a picture tube for the welding operation, a carrier on which a plurality of weld guns are mounted over the picture tube and means for lowering and lifting the battery of weld guns. Chucks or holders for the studs which are to be welded are lifted and lowered with the weld guns for lowering the studs to welding position.

Referring to the accompanying drawings which illustrate a preferred form of the invention:

Fig. 1 is an elevational view of the apparatus, parts being broken away;

Fig. 2 is an elevational view of a portion of the apparatus on a larger scale;

Fig. 3 is a fragmentary sectional view showing the metal ring to which th studs are welded;

Fig. 4 is a top plan view of the apparatus with parts broken away;

Fig. 5 is a part sectional view on a comparatively large scale showing a stud holder or chuck and its connection with a weld gun; and Fig. 6 is a perspective view of the electrical control mechanism for the weld guns.

As shown on the drawings, the apparatus comprises a framework 10 on which a picture tube 11 is supported for the welding operation and an assembly 12 comprising a carriage 28 and a plurality of weld guns 13 mounted thereon. The carriage is movable up and down for moving the weld guns to and from the welding position. The picture tube comprises a funnel-shaped glass body with an integral stem 14. An annular connecting member or ring 15 is welded to the rim of the tube 11. The present invention provides means for simultaneously welding a plurality of metal studs 16 to to the ring 15. The ring 15 and studs 16 both consist of stainless steel. Metal plates or disks 17 (Fig. 3) welded to the ring 15 and made of the same material, have the studs welded directly thereto.

Fig. 5 illustrates one of the holders or chucks for holding the studs 16. It comprises spring jaws 18 surrounded by a tubular member 19. A coil compression spring 20 is mounted within the tube 19 and surrounds the holding jaws 18. The tube 19 is mounted for up-and-down sliding movement within a cylindrical casing or shell 21. The shell 21 is attached to a tubular shaft 22 depending from a weld gun 13. The tube 19 is formed with a shoulder 24 to seat on a stop surface formed on the shell 21 while the tube 19 is in its lowered position relative to the shell 21 and is yieldingly held in such lowered position by the compression spring 20. A ferrule 25 made of a ceramic or other electrically insulating material is mounted in the lower end of the tube 19.

The weld guns 13 are supported on the carriage 28 mounted for up-and-down movement by which the guns are lifted and lowered. Each weld gun is attached to a bracket 30 mounted on a supporting plate 31, the latter being connected by bolts 32 to the carriage 28. The carriage 28 is slidably supported and guided in its up-and-down movements by a vertical supporting bar 33 attached to the frame 10.

The carriage with the weld guns thereon is lifted and lowered by an air-operated piston motor 35 comprising a cylinder having a stationary mounting and a piston rod 36 having a connection 37 with the carriage. The operation of the air motor is controlled by a valve 38 operated by a hand lever 39. Air under pressure is supplied through the valve 38 and pipes 40 and 41 extending from the valve to the lower and upper ends of the cylinder 35. The weight of the carriage and its load are counterbalanced by a counterweight 44 connected to the carriage by cable 45 running over pulleys 46 and 47 journalled in arms 48 fixed to the frame 10.

The picture tube or funnel 11 is supported in a bracket 50 during the welding operation, the bracket being mounted on a carrier 51.

The electric weld guns 13 and the electric operating and control means therefor are old in the art and accordingly are not described herein in detail. The electric current is supplied through conductors 53 (Fig. 6) to a control box 54 from which conductors 55 extend to the weld guns 13.

In operation, a picture tube 11 is placed in the bracket 50 and studs 16 which are to be welded are slipped into the chucks 18. The valve lever 39 is then operated in a direction to cause the air motor 35 to lower the carriage 12 thereby lowering the weld guns and the chucks to the welding position in which the insulating ferrules 25 seat on the ring 15 or metal disks 17 (Fig. 3). A continued downward movement of the chucks against the compressive force of the springs 20 brings the studs into contact with the disks 17. The electric welding guns now operate in a conventional manner. First, the electric current is turned on, the weld guns are then retracted a short distance, thereby permitting the springs 20 to lift the studs 16 a short distance, for example, an eighth of an inch. This causes each stud to draw an arc. The electric current is maintained a sufficient length of time for heating the studs to a welding temperature. The weld guns are then lowered so that the studs are pressed against the disks 17 and welded thereto. In this manner the studs are accurately located and welded to the ring 15 at uniformly spaced positions.

Modifications may be resorted to within the spirit and scope of my invention.

I claim:

1. Apparatus for welding metal studs to a metal rim of a picture tube, said apparatus comprising a support, means for attaching a picture tube to the said support, said picture tube comprising a metal rim, a carriage, a frame on which the carriage is mounted over said support and the attached picture tube, means for moving the carriage up and down, the frame comprising a fixed vertical supporting bar on which the carriage is slidably supported and guided in its up-and-down movements, holders for the said metal studs, said holders comprising chucks mounted for up-an-down movement with the carriage, said chucks comprising spring gripping jaws by which the studs are gripped for up-and-down movement with the chucks, weld guns individual to said chucks, and means for supplying electric current to the weld guns.

2. The apparatus defined in claim 1, including a tubular member surrounding said jaws, and a coil spring mounted in said tubular member and yieldingly holding said tubular member in a downwardly projected position relative to the chuck.

3. The apparatus defined in claim 2, insulating ferrules mounted in said tubular members in position to contact said metal rim when the chucks are lowered to an intermediate position, said springs permitting continued downward movement of the studs into contact with the metal part so that they draw electric arcs when withdrawn, thereby permitting the studs to be brought to a welding temperature and thereafter to be moved downwardly into contact with the metal part and thereby welded thereto.

4. Apparatus for welding studs to a metal rim of a picture tube, said apparatus comprising a support, means for attaching a picture tube to the support with the rim of the tube facing upwardly, a carriage, a frame on which the carriage is supported and guided for up-and-down movement, the carriage being positioned over and spaced above the mounted picture tube, means for moving the carriage up and down on its support, stud holders mounted on the carriage, weld guns individual to said holders and mounted for up-and-down movement with the carriage, said stud holders being movable into contact with the said rim when the carriage is lowered and thereby arrested in their downward movement, said holders comprising spring gripping jaws positioned and operative to hold the studs spaced above and out of contact with the said rim when the said holders contact the rim, means for transmitting downward movement of the carriage to the gripping jaws and studs held thereby, means for bringing said studs into contact with said rim while the holders are in contact with said rim, means for supplying electric current to the weld guns, means for retracting the studs and thereby drawing arcs between the studs and said rim and thereafter lowering the studs into contact with said rim for welding them thereto.

5. The apparatus defined in claim 4, the means for lifting and lowering the carriage comprising a piston motor mounted on said frame and operatively connected to the carriage.

6. The apparatus defined in claim 5, including a counterbalance weight, a cable connecting said weight to the carriage and guide pulleys mounted in said frame and over which the cable is trained.

7. The apparatus defined in claim 9, each of said chucks including a vertically disposed cylindrical shell, a tube mounted within the shell for up-and-down movement relative to the shell and protruding downward below the lower end of the shell, spring jaws mounted within the tube, the lower ends of said jaws being spaced above the lower end of the tube, said tube being open at its lower end to permit a stud to be moved upwardly into position to be gripped by said jaws, with the lower end of the stud positioned above the lower end of the tube, a coil compression spring mounted within the tube and yieldingly holding the tube in its lower position relative to said shell, said tube being movable upward relative to the shell and gripping jaws into position to contact the said stud with the workpiece when the tube is brought into contact with the workpiece and said shell moved downward relative thereto, and means for supplying a welding current to the studs and workpiece.

8. The apparatus defined in claim 7, each chuck including a ferrule of electrically non-conducting material mounted in said open lower end of the tube and through which the stud is movable into engagement with the gripping jaws, said ferrule being positioned to form a stop for said tube when the latter is moved downward to engage a workpiece.

9. A welding apparatus including a plurality of chucks, said apparatus including a stationary holder, means for attaching to the holder a workpiece comprising a metal ring with the ring horizontally disposed in the holder, a carriage on which the chucks are mounted above the workpiece, with the said chucks directly over said ring and uniformly spaced circumferentially thereof, a vertical guide bar, said carriage having slidable connection therewith, a motor, means forming a driving connection between the motor and carriage for moving the latter up and down along the slide bar and thereby moving the chucks into and out of engagement with the workpiece.

References Cited in the file of this patent

UNITED STATES PATENTS

| | | |
|---|---|---|
| 2,238,054 | Hart | Apr. 15, 1941 |
| 2,499,262 | Stoudt | Feb. 28, 1950 |
| 2,640,133 | Ainsworth et al. | May 26, 1953 |
| 2,727,123 | Gregory | Dec. 13, 1955 |

FOREIGN PATENTS

| | | |
|---|---|---|
| 871,795 | France | Jan. 22, 1942 |
| 635,625 | Great Britain | Apr. 12, 1950 |
| 677,449 | Great Britain | Aug. 13, 1952 |